United States Patent [19]
Oishi

[11] Patent Number: 5,923,510
[45] Date of Patent: Jul. 13, 1999

[54] MAGNETIC DISC CARTRIDGE

[75] Inventor: Kengo Oishi, Kanagawa-ken, Japan

[73] Assignee: Fuji Photo Film Co., Ltd., Japan

[21] Appl. No.: 09/056,981

[22] Filed: Apr. 8, 1998

[30]     Foreign Application Priority Data

Apr. 9, 1997   [JP]   Japan .................................... 9-090619

[51] Int. Cl.⁶ .............................................. G11B 23/03
[52] U.S. Cl. ........................................ 360/133; 369/291
[58] Field of Search .............................. 360/133; 369/291

[56]            References Cited

U.S. PATENT DOCUMENTS

| | | | |
|---|---|---|---|
| 3,947,893 | 3/1976 | Hall, Sr. ................................... | 360/133 |
| 4,583,213 | 4/1986 | Bracken et al. ......................... | 369/261 |
| 5,175,726 | 12/1992 | Imokawa ................................. | 369/291 |
| 5,708,547 | 1/1998 | Oishi ....................................... | 360/133 |
| 5,793,583 | 8/1998 | Osihi ....................................... | 360/133 |

*Primary Examiner*—William J Klimowicz
*Attorney, Agent, or Firm*—Brinks Hofer Gilson & Lione

[57]              ABSTRACT

A magnetic disc cartridge includes a cartridge shell and a magnetic disc which is formed integrally with a center core member and is supported for rotation in the shell. The shell is provided with a magnetic head window through which a magnetic head of a recording and reproducing system is given access to the magnetic disc and a spindle hole through which a spindle of the recording and reproducing system is engaged with the center core member to rotate the magnetic disc with the center core member. There is disposed between at least one side of the magnetic disc and the inner surface of the shell opposed to the side of the magnetic disc a wobbling suppressing plate which is in the form of a substantially circular flat plate and is movable in the direction of the axis of rotation of the magnetic disc at least at its outer peripheral portion.

8 Claims, 4 Drawing Sheets

MAGNETIC DISC CARTRIDGE

BACKGROUND OF THE INVENTION

1. Field of the Invention

This invention relates to a magnetic disc cartridge, and more particularly to a magnetic disc cartridge comprising a thin shell and a magnetic disc which is formed integrally with a center core member and is supported for rotation in the shell.

2. Description of the Related Art

There has been known a magnetic disc cartridge which comprises a thin cartridge shell formed of a pair of shell halves of plastic mated together and a magnetic disc which is formed integrally with a center core member and is supported for rotation in the shell, the shell being provided with a magnetic head window through which a magnetic head of a recording and reproducing system is given access to the magnetic disc and a spindle hole through which a spindle of the recording and reproducing system is engaged with the center core member to rotate the magnetic disc with the center core member. The magnetic head window is provided with a shutter which closes the magnetic head window when the magnetic disc cartridge is not used in order to prevent dust and/or dirt from entering the cartridge.

A liner of nonwoven material is attached to the inner surface of the shell opposed to each side of the magnetic disc to prevent the surface of the magnetic disc from being damaged and to wipe dust and/or dirt off the surface of the disc when the disc is rotated.

Recently, with advent of a novel high density recording system, there has been developed a magnetic disc cartridge having a magnetic disc whose recording capacity is fifty times as large as that of the currently prevailing 3.5 inch floppy disc. In such a large capacity magnetic disc cartridge, the magnetic disc is rotated at much higher speed than the conventional magnetic disc cartridge in order to increase the recording density and the transfer rate and at the same time, the magnetic disc must be positioned with respect to the magnetic head at an extremely high accuracy.

In the large capacity magnetic disc cartridge, the magnetic disc is rotated at 2500 to 5000 rpm in order to ensure a high transfer rate. In such a case, wobbling of the surface of the magnetic disc occurs due to the condition of application of the center core member to the disc, curl of the disc itself and fluctuation in air flow between the inner surface of the shell and the surface of the disc.

Such wobbling of the disc surface is more apt to occur when the cross-section of the shell fluctuates across the shell due to unevenness on the inner surface of the shell.

Though the wobbling of the disc surface can be suppressed by a means which is brought into contact with the magnetic disc (e.g., by lifting the liner in the conventional micro floppy disc into contact with the disc), such an approach gives rise to a problem that frictional heat and/or damage on the disc are generated due to contact with the disc which is rotating at high speed.

SUMMARY OF THE INVENTION

In view of the foregoing observations and description, the primary object of the present invention is to provide a magnetic disc cartridge in which wobbling of the disc surface can be suppressed without contacting the magnetic disc.

The magnetic disc cartridge of this embodiment is characterized in that there is disposed between at least one side of the magnetic disc and the inner surface of the shell opposed to the side of the magnetic disc a wobbling suppressing plate which is in the form of a substantially circular flat plate and is movable in the direction of the axis of rotation of the magnetic disc at least at its outer peripheral portion.

It is preferred that the wobbling suppressing plate be resilient and be provided with a cutaway portion in a position opposed to the magnetic head window.

Preferably the wobbling suppressing plate is integrally provided with a cleaning member for trapping dust and/or dirt on the side facing the magnetic disc.

In this case, the wobbling suppressing plate may be formed by a flexible thin base plate of plastic or metal and a cleaning member of nonwoven material.

In one embodiment, at least two guide projections are provided on the inner surface of the shell outside the area in which the magnetic disc rotates and are loosely fitted in guide holes formed in the wobbling suppressing plate so that the wobbling suppressing plate is held by the guide projections to be movable in the direction of the axis of rotation of the magnetic disc.

In this case, it is preferred that the cartridge shell be formed by a pair of shell halves which are mated together with said guide projections formed on one of the shell halves and with tubular projections formed on the other shell half so that the guide projections are partly inserted into the tubular projections when the shell halves are mated together, and the end faces of the tubular projections limit the movement of the wobbling suppressing plate toward the magnetic disc so that the maximum distance of the surface of the wobbling suppressing plate facing the magnetic disc from the inner surface of the shell is smaller than the distance of the surface of the magnetic disc facing the wobbling suppressing plate from the inner surface of the shell.

In another embodiment of the present invention, the wobbling suppressing plate is flexible and is fixed to the shell at a central portion thereof at a predetermined distance from the inner surface of the shell so that the outer peripheral portion of the wobbling suppressing plate can be moved in the direction of the axis of rotation of the magnetic disc by virtue of the flexibility of the wobbling suppressing plate.

In this case, preferably, the wobbling suppressing plate is provided with a center core insertion opening which is circular or C-shaped and is not smaller than the spindle hole and the wobbling suppressing plate is fixed to the shell near the peripheral edge of the opening.

At least the outer peripheral portion of the wobbling suppressing plate is caused to approach the magnetic disc upon rotation of the magnetic disc.

In the magnetic disc cartridge of the present invention, when the magnetic disc is rotated and air flow is generated between the magnetic disc and the wobbling suppressing plate, a negative pressure is generated between the magnetic disc and the wobbling suppressing plate and the wobbling suppressing plate is attracted toward the magnetic disc cartridge to a position close to the magnetic disc, whereby the magnetic disc comes to rotate in a plane which follows the flat surface of the wobbling suppressing plate and wobbling of the magnetic disc surface is suppressed.

When at least two guide projections are provided on the inner surface of the shell outside the area in which the magnetic disc rotates and are loosely fitted in guide holes formed in the wobbling suppressing plate so that the wobbling suppressing plate is held by the guide projections to be movable in the direction of the axis of rotation of the magnetic disc, the wobbling suppressing plate can be smoothly moved in the direction of the axis of rotation of the magnetic disc.

Further when the guide projections are formed on one of the shell halves with tubular projections formed on the other shell half so that the guide projections are partly inserted into the tubular projections when the shell halves are mated together, and the end faces of the tubular projections limit the movement of the wobbling suppressing plate toward the magnetic disc so that the maximum distance of the surface of the wobbling suppressing plate facing the magnetic disc from the inner surface of the shell is smaller than the distance of the surface of the magnetic disc facing the wobbling suppressing plate from the inner surface of the shell, the wobbling suppressing plate is held close to the rotating magnetic disc and the magnetic disc comes to rotate in a plane which follows the flat surface of the wobbling suppressing plate, whereby wobbling of the magnetic disc surface is effectively suppressed.

When the wobbling suppressing plate is provided with a cleaning member formed of nonwoven material on the side facing the magnetic disc, dust and/or dirt moving along the surface of the magnetic disc can be effectively trapped by the cleaning member and by holding the wobbling suppressing plate in a position where the cleaning member cannot be brought into contact with the magnetic disc, there is no fear that the cleaning member damages the magnetic disc.

When the wobbling suppressing plate is flexible and is fixed to the shell at a central portion thereof at a predetermined distance from the inner surface of the shell, air flow is generated between the magnetic disc and the wobbling suppressing plate to generate therebetween a negative pressure upon rotation of the magnetic disc and the wobbling suppressing plate is attracted toward the magnetic disc cartridge. At this time since the wobbling suppressing plate is fixed at its central portion, only the outer peripheral portion is attracted to a position close to the magnetic disc, whereby the outer peripheral portion of the rotating magnetic disc comes to rotate in a plane which follows the flat surface of the outer peripheral portion of the wobbling suppressing plate and wobbling of the magnetic disc surface is suppressed. Since wobbling of the magnetic disc surface is generally is generally larger at the outer peripheral portion than at the central portion, this arrangement is effective.

DESCRIPTION OF THE PREFERRED EMBODIMENTS

Figure 1:
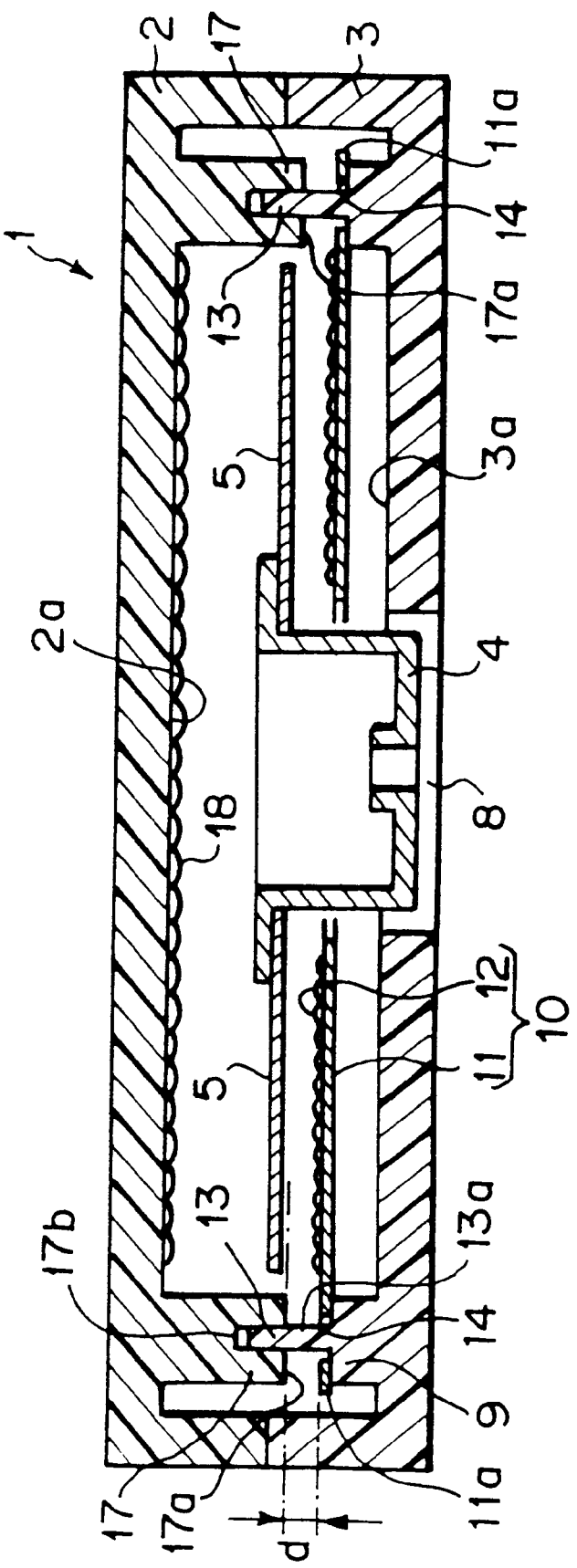
FIG. 1 is a schematic cross-sectional view showing a magnetic disc cartridge in accordance with an embodiment of the present invention.
Figure 2:
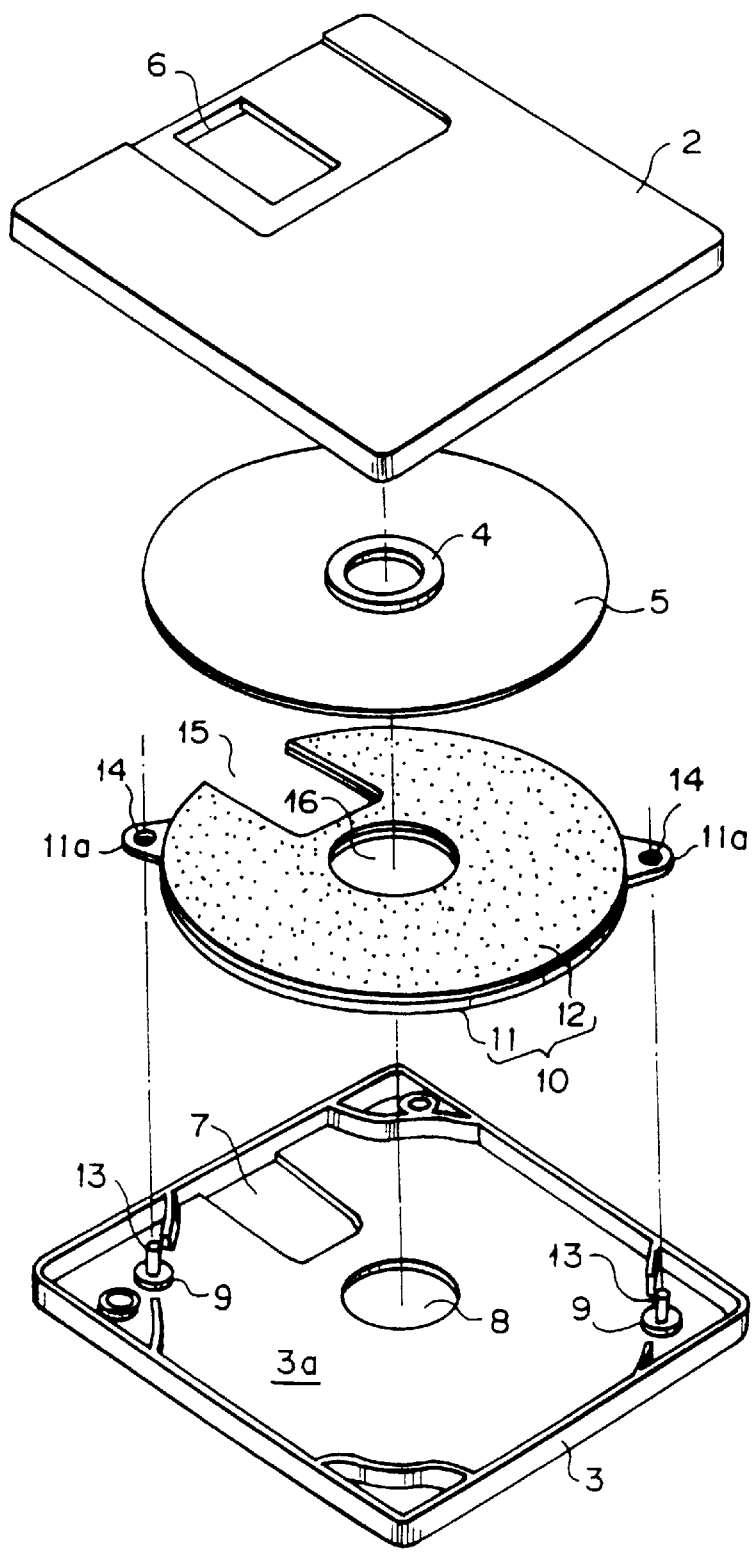
FIG. 2 is an exploded perspective view of the magnetic disc cartridge.
Figure 3:
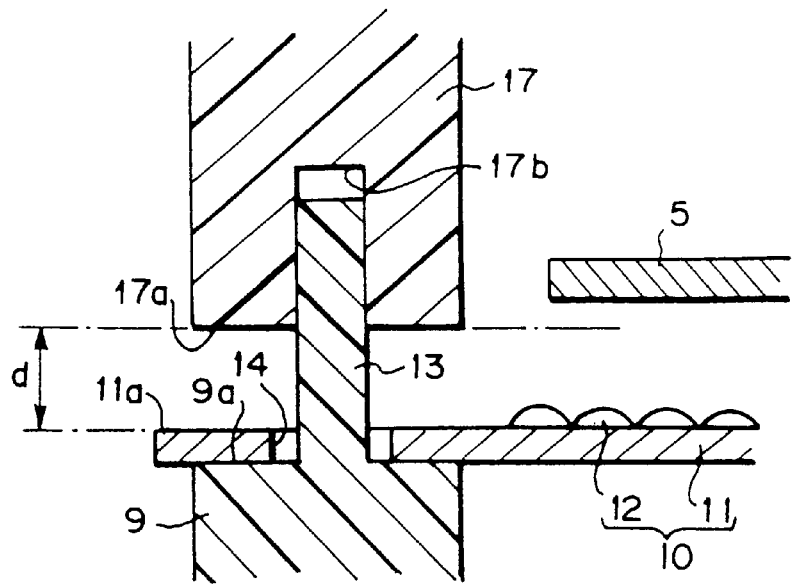
FIG. 3 is an enlarged cross-sectional view of an important part of the magnetic disc cartridge.

In FIGS. 1 to 3, where dimensions of the parts are not in the real ratios for the purpose of simplification of understanding, a magnetic disc cartridge 1 in accordance with an embodiment of the present invention comprises a cartridge shell formed by upper and lower shell halves 2 and 3 mated together. A magnetic disc 5 integrated with a center core member 4 is supported for rotation in the shell.

As shown in FIG. 2, the upper and lower shell halves 2 and 3 are provided with rectangular openings 6 and 7 which form a magnetic head window when the shell halves 2 and 3 are mated together. The magnetic head window formed by the openings 6 and 7 is closed and opened by a shutter member (not shown). The lower shell half 3 is provided with a circular spindle hole 8 at the central portion thereof. A spindle (not shown) of a recording and reproducing system is inserted into the shell through the spindle 8 and is engaged with the center core member 4 to rotate the magnetic disc 5.

A wobbling suppressing plate 10 for suppressing wobbling of the magnetic disc 5 is disposed between the inner surface 3a of the lower shell half 3 and the magnetic disc 5. The wobbling suppressing plate 10 comprises a circular flat base plate 11 which is formed of resilient plastic material or metal, and a cleaning member 12 which is attached to the surface of the base plate 11 facing the magnetic disc 5. The cleaning member 12 is formed of nonwoven material which traps dust and/or dirt on the magnetic disc 5. The wobbling suppressing plate 10 is provided with a cutaway portion in a position opposed to the opening 6 and 7 of the upper and lower shell halves 2 and 3 and a circular center core insertion hole 16 at the central portion thereof. The center core insertion hole 16 is not smaller than the spindle hole 8 in diameter. The center core insertion hole 16 may be communicated with the cutaway portion 15 to form a C-shaped cutaway portion.

A pair of cylindrical bosses 9 stand upward from the inner surface 3a of the lower shell half 3 at corners which are diagonally spaced from each other. The upper end faces 9a of the bosses 9 are flat and are substantially at the same level. A guide projection 13 stands upward from the upper end face 9a of each boss 9 coaxially with the boss 9. The guide projections 13 are outside the area in which the magnetic disc 5 rotates.

A pair of tabs 11a extend outward from the outer periphery of the wobbling suppressing plate 10 diametrically opposed to each other. Each tab 11a is provided with an opening 14 and the openings 14 of the respective tabs 11a are loosely fitted on the guide projections 13 so that the tabs 11a rest on the flat upper end faces 9a of the bosses 9. Thus the wobbling suppressing plate 10 is held to be movable in the direction of axis of rotation of the magnetic disc 5.

A pair of tubular projections 17 stand from the inner surface 2a of the upper shell half 2 in positions opposed to the guide projections 13 on the lower shell half 3. Each tubular projection 17 is provided with a hole 17b extending in the longitudinal direction thereof. When the upper and lower shell halves 2 and 3a are mated together, the guide projections 13 are partly inserted into the tubular projections 17. As clearly shown in FIG. 3, each tubular projection 17 is substantially the same as the boss 9 in the outer diameter and is provided with a flat lower end face 17a which is opposed to the flat upper end face 9a of the boss 9.

The lower end faces 17a of the tubular projections 17 defines a maximum movable range d of the wobbling suppressing plate 10. The maximum movable range d of the wobbling suppressing plate 10 is set so that when the wobbling suppressing plate 10 is moved to the uppermost position where the tabs 11a on the base plate 11 are brought into abutment against the lower end faces 17a of the tubular projections 17, the surface of the cleaning member 12 is positioned close to the lower surface of the magnetic disc 5 which is rotating but is not brought into contact with the lower surface of the magnetic disc 5. That is, the lower end faces 17a of the tubular projections 17 limit the maximum distance of the surface of the wobbling suppressing plate 10 facing the magnetic disc 5 from the inner surface 3a of the lower shell half 3 is smaller than the distance of the surface of the magnetic disc 5 facing the wobbling suppressing plate 10 from the inner surface 3a of the lower shell half 3.

Another cleaning member 18 of nonwoven material is attached to the inner surface 2a of the upper shell half 2.

In the magnetic disc cartridge 1 of this embodiment, since the wobbling suppressing plate 10 is movable along the guide projections 13 in the direction of the axis of rotation of the magnetic disc 5, when the magnetic disc 5 is rotated at a high speed and air flow is generated between the magnetic disc 5 and the wobbling suppressing plate 10, the wobbling suppressing plate 10 is attracted toward the magnetic disc 5 by a negative pressure generated between the magnetic disc 5 and the wobbling suppressing plate 10. However the movement of the wobbling suppressing plate 10 toward the magnetic disc 5 is limited by the lower end faces 17a of the tubular projections 17 and the wobbling suppressing plate 10 is held close to the magnetic disc 5 which is rotating. Then the wobbling suppressing plate 10 is held stationary there and accordingly, the magnetic disc 5 comes to rotate in a plane which follows the flat surface of the wobbling suppressing plate 10 and wobbling of the magnetic disc surface is suppressed.

Further the cleaning member 12 effectively traps dust and/or dirt moving along the surface of the magnetic disc 5. At the same time since the wobbling suppressing plate 10 is held in a position where the cleaning member 12 is not brought into contact with the magnetic disc 5, there is no fear that the cleaning member 12 damages the magnetic disc 5.

Figure 4:
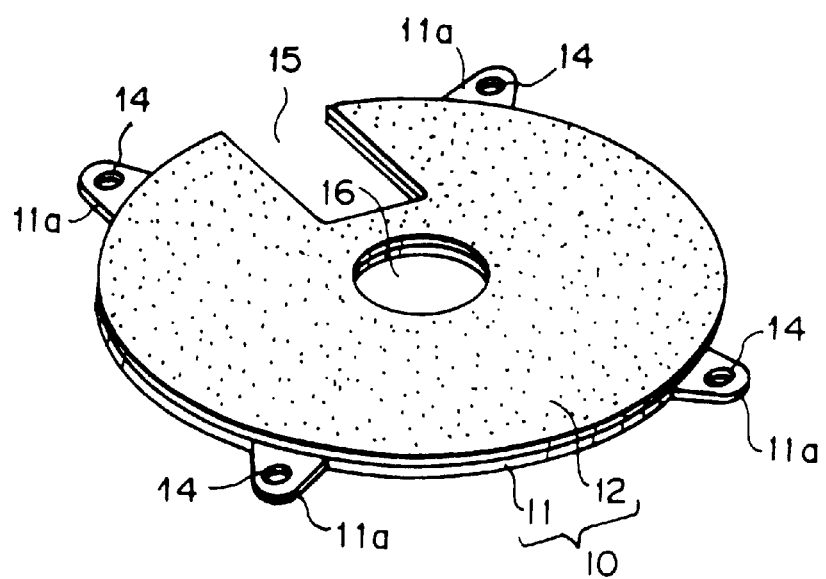
FIG. 4 is a perspective view showing a modification of the wobbling suppressing plate.

Though in the embodiment described above, the wobbling suppressing plate 10 is supported at a pair of corners diagonally opposed to each other, the wobbling suppressing plate 10 may be supported at four corners by forming the guide projections 13 at four corners of the lower shell half 3 and forming the tabs 11a in four positions opposed to the four corners of the lower shell half 3 as shown in FIG. 4.

Figure 5:
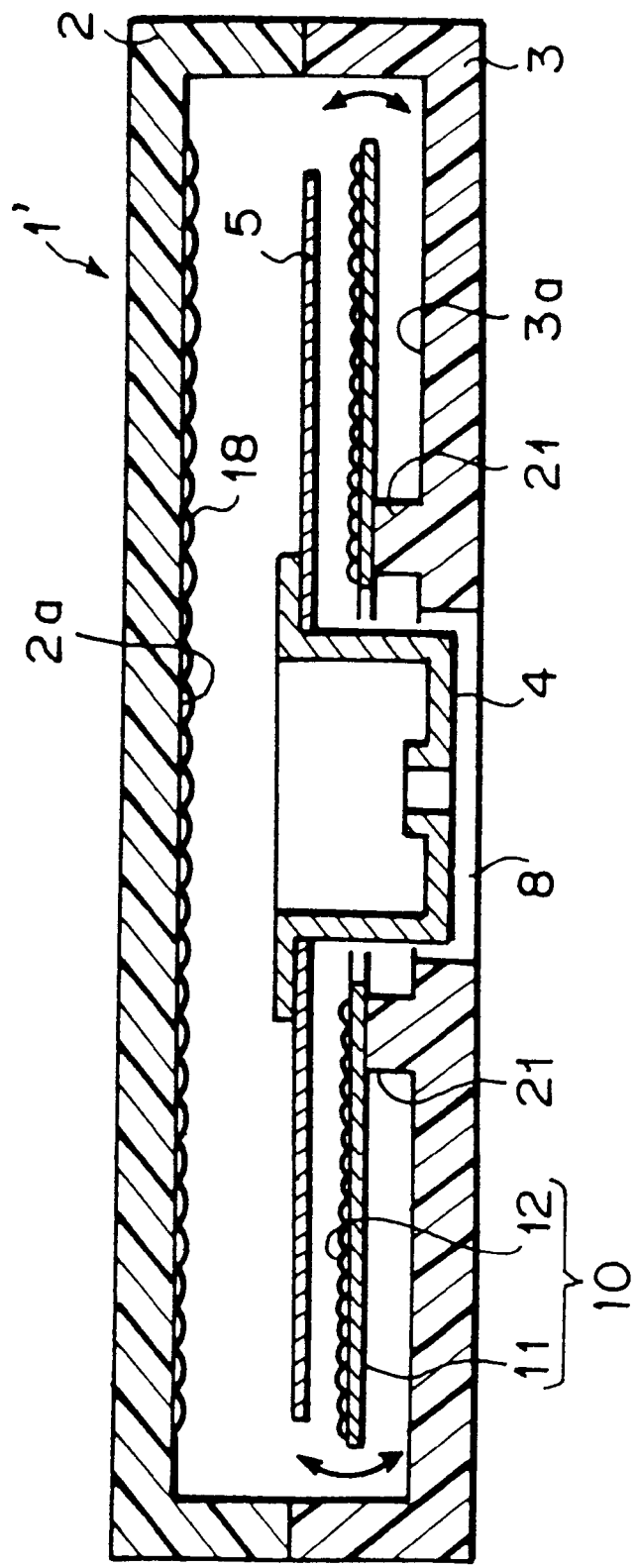
FIG. 5 is a schematic cross-sectional view showing a magnetic disc cartridge in accordance with another embodiment of the present invention.

Another embodiment of the present invention will be described with reference to FIG. 5, hereinbelow. In FIG. 5, the elements analogous to those shown in FIG. 1 are given the same reference numerals and will not be described here. The magnetic disc cartridge 1' of this embodiment differs from the magnetic disc cartridge 1 of the preceding embodiment in that an annular rib 21 having a flat top surface is provided around the spindle hole 8 of the lower shell half 3 in a predetermined height and the wobbling suppressing plate 10 is fixed to the top surface of the annular rib 21 instead of supporting the wobbling suppressing plate 10 by the guide projections 13, the tubular projections 17 and the tabs 11a as in the preceding embodiment.

In this embodiment, the base plate 11 of the wobbling suppressing plate 10 is formed of a flexible material and the outer peripheral portion of the wobbling suppressing plate 10 can be moved in the direction of the axis of rotation of the magnetic disc 5 by virtue of the flexibility of the base plate 11.

In the magnetic disc cartridge 1' of this embodiment, when the magnetic disc 5 is rotated at a high speed and air flow is generated between the magnetic disc 5 and the wobbling suppressing plate 10, the outer peripheral portion of the wobbling suppressing plate 10 is attracted toward the magnetic disc 5 by a negative pressure generated between the magnetic disc 5 and the wobbling suppressing plate 10. However since the central portion of the wobbling suppressing plate 10 is fixed to the annular rib 21, the movement of the wobbling suppressing plate 10 toward the magnetic disc 5 is limited and only the outer peripheral portion of the wobbling suppressing plate 10 is held close to the magnetic disc 5 which is rotating. Then the magnetic disc 5 comes to rotate in a plane which follows the outer peripheral portion of the wobbling suppressing plate 10 and wobbling of the magnetic disc surface is suppressed.

Also in this embodiment, the cleaning member 12 effectively traps dust and/or dirt moving along the surface of the magnetic disc 5. At the same time since the wobbling suppressing plate 10 is held in a position where the cleaning member 12 is not brought into contact with the magnetic disc 5, there is no fear that the cleaning member 12 damages the magnetic disc 5.

The wobbling suppressing plate 10 may be disposed between the magnetic disc 5 and the inner surface 2a of the upper shell half 2 instead of between the magnetic disc 5 and the inner surface 3a of the lower shell half 3, and may be disposed both between the magnetic disc 5 and the inner surface 2a of the upper shell half 2 and between the magnetic disc 5 and the inner surface 3a of the lower shell half 3.

What is claimed is:

1. A magnetic disc cartridge comprising a cartridge shell and a magnetic disc which is formed integrally with a center core member and is supported for rotation in the shell, the shell being provided with a magnetic head window through which a magnetic head of a recording and reproducing system is given access to the magnetic disc and a spindle hole through which a spindle of the recording and reproducing system is engaged with the center core member to rotate the magnetic disc with the center core member, wherein the improvement comprises that there is disposed between at least one side of the magnetic disc and the inner surface of the shell opposed to the side of the magnetic disc a wobbling suppressing plate which is in the form of a substantially circular flat plate and is movable in the direction of the axis of rotation of the magnetic disc at least at its outer peripheral portion.

2. A magnetic disc cartridge as defined in claim 1 in which the wobbling suppressing plate is resilient and is provided with a cutaway portion in a position opposed to the magnetic head window.

3. A magnetic disc cartridge as defined in claim 1 in which the wobbling suppressing plate is integrally provided with a cleaning member for trapping dust and/or dirt on the side facing the magnetic disc.

4. A magnetic disc cartridge as defined in claim 3 in which the wobbling suppressing plate is formed by a flxible thin base plate of plastic or metal and a cleaning member of nonwoven material.

5. A magnetic disc cartridge as defined in claim 1 in which at least two guide projections are provided on the inner surface of the shell outside the area in which the magnetic disc rotates and are loosely fitted in guide holes formed in the wobbling suppressing plate so that the wobbling suppressing plate is held by the guide projections to be movable in the direction of the axis of rotation of the magnetic disc.

6. A magnetic disc cartridge as defined in claim 5 in which the cartridge shell is formed by a pair of shell halves which are mated together with said guide projections formed on one of the shell halves and with tubular projections formed on the other shell half so that the guide projections are partly inserted into the tubular projections when the shell halves are mated together, and the end faces of the tubular projections limit the movement of the wobbling suppressing plate toward the magnetic disc so that the maximum distance of the surface of the wobbling suppressing plate facing the magnetic disc from the inner surface of the shell is smaller than the distance of the surface of the magnetic disc facing the wobbling suppressing plate from the inner surface of the shell.

7. A magnetic disc cartridge as defined in claim 1 in which the wobbling suppressing plate is flexible and is fixed to the shell at a central portion thereof at a predetermined distance from the inner surface of the shell so that the outer peripheral portion of the wobbling suppressing plate can be moved in the direction of the axis of rotation of the magnetic disc by virtue of the flexibility of the wobbling suppressing plate.

8. A magnetic disc cartridge as defined in claim 7 in which the wobbling suppressing plate is provided with a center core insertion opening which is circular or C-shaped and is not smaller than the spindle hole and the wobbling suppressing plate is fixed to the shell near the peripheral edge of the opening.

* * * * *